No. 783,324. PATENTED FEB. 21, 1905.
E. D. SNYDER.
PRUNING HOOK
APPLICATION FILED JULY 25, 1904.
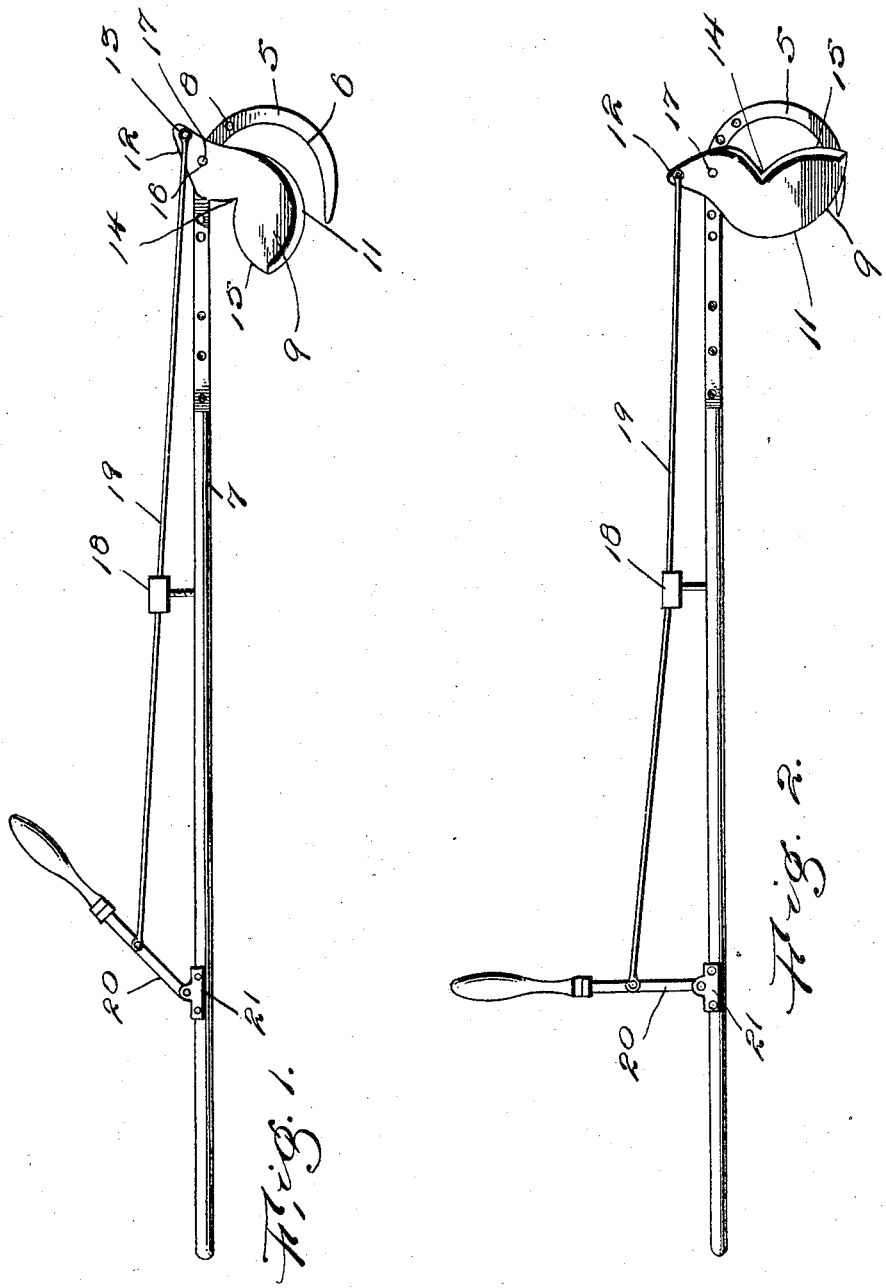

No. 783,324. Patented February 21, 1905.

UNITED STATES PATENT OFFICE.

ERNEST D. SNYDER, OF MERCER, PENNSYLVANIA.

PRUNING-HOOK.

SPECIFICATION forming part of Letters Patent No. 783,324, dated February 21, 1905.

Application filed July 25, 1904. Serial No. 218,078.

*To all whom it may concern:*

Be it known that I, ERNEST D. SNYDER, a citizen of the United States, residing at Mercer, in the county of Mercer, State of Pennsylvania, have invented certain new and useful Improvements in Pruning-Hooks; and I do hereby declare the following to be a full, clear, and exact description of the invention, such as will enable others skilled in the art to which it appertains to make and use the same.

This invention relates to pruning-hooks; and it has for its object to provide a construction which will be cheap, simple, and durable and which may be adjusted in different ways to suit different specific conditions of operation.

In the drawings forming a portion of this specification, and in which like numerals of reference indicate similar parts in both views, Figure 1 is an elevation of the implement with the blades separated ready to receive a branch to be cut. Fig. 2 is an elevation showing the movable blade in reversed position.

Referring now to the drawings, the present implement comprises a hook-shaped blade 5, the bill and the adjacent portion of the bight of which is sharpened within the inclosure of the hook to form a cutting edge 6 of arc shape. The hook 5 is mounted upon a handle 7, and the stem and adjacent portion of the bight of the hook are provided with a series of perforations 8.

In connection with the hook or fixed blade of the implement there is employed a movable blade one side edge of which is substantially semicircular, as shown at 9, this curved edge being sharpened from one end for substantially one-half its length, as shown at 11, the opposite end of the blade having a stem 12, perforated, as shown at 13, at its extremity. In the opposite edge of the blade there is a rectangular notch 14, the side of which farthest from the stem 12 is sharpened, as shown at 15.

A perforation 16 is formed through the movable blade at the base of the stem 12 to receive a pivot-bolt 17, which is adapted for engagement with the perforations 8 interchangeably to connect the movable blade at different points along the fixed or hooked blade. A T-shaped guide 18 is mounted upon the handle 7, and through it is passed the rod 19, which is pivotally engaged at one end in the perforation 13, while its opposite end is pivotally connected with a hand-lever 20, which is pivoted to a plate 21, fixed to the handle 7. By manipulating the lever 20 the movable blade is swung toward and away from the fixed blade, and by engaging the bolt 17 in different ones of the perforations 8 the cutting edges will be caused to engage different portions thereof with the materials to be cut, and the strain will be differently applied, as will be understood. The movable blade may be connected either as illustrated in Fig. 1 or as illustrated in Fig. 2, so that either of its cutting edges may be active to suit corresponding specific conditions.

What is claimed is—

An implement of the class described comprising a hooked blade having the inner edge of the bill and the adjacent portion of the bight sharpened and having a series of perforations through the stem and adjacent bight portion, a reversible movable blade having an arc-shaped cutting edge at one side and having its opposite side notched and one side of the notch sharpened, a pivot-bolt engaged through the movable blade and adapted for engagement with the series of perforations interchangeably, a lever pivoted to the handle and connections between the lever and movable blade for actuating the latter.

In testimony whereof I affix my signature in presence of two witnesses.

ERNEST D. SNYDER.

Witnesses:
T. C. COCHRAN,
THOS. J. MICKUM.